Feb. 14, 1939.    L. RICEFIELD    2,146,766
COUPLING
Filed Nov. 26, 1937    2 Sheets-Sheet 1

Inventor
Louis Ricefield
By Davis, Lindsey, Smith & Shonts, Attys.

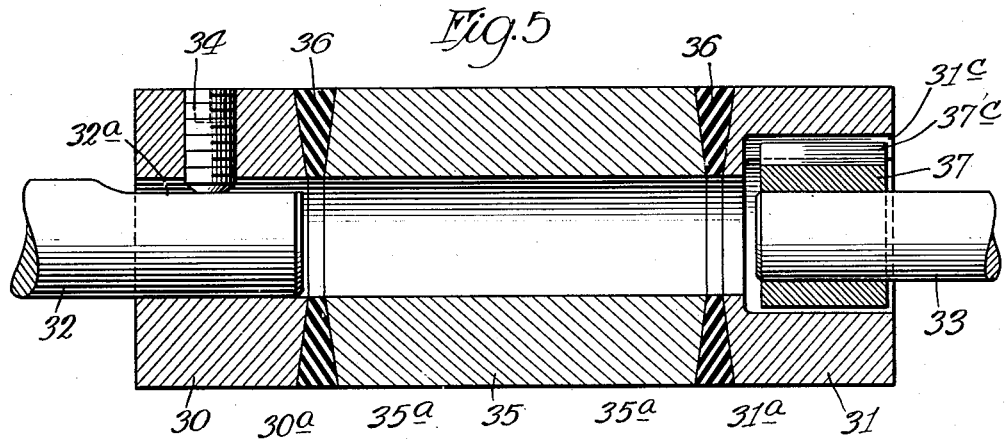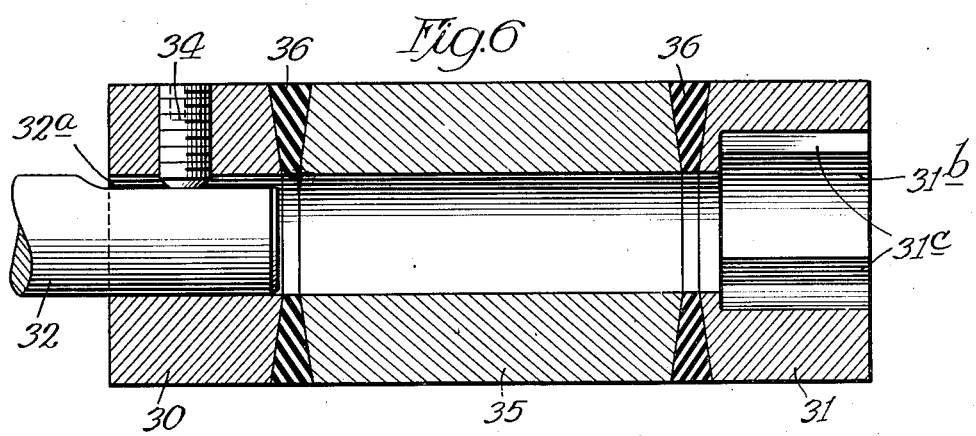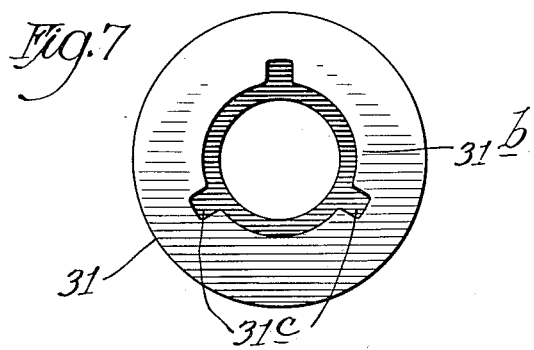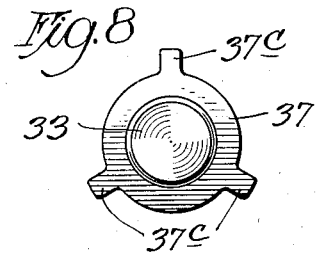

Patented Feb. 14, 1939

2,146,766

UNITED STATES PATENT OFFICE 2,146,766

COUPLING

Louis Ricefield, Oak Park, Ill.

Application November 26, 1937, Serial No. 176,401

3 Claims. (Cl. 64—11)

This invention relates to improvements in couplings for connecting substantially aligned shafts and its purpose is to provide an improved device of simple form, and capable of being manufactured at small cost, which will compensate for angular misalignment, relative lateral displacement and relative endwise movement of two connected shafts.

The improvement is particularly useful for connecting shafts of small size through which a small amount of power is to be transmitted and which have their adjacent ends spaced a substantial distance apart. An attempt has heretofore been made to meet the requirements of this type of service by providing a coupling comprising two coupling members, adapted to be secured to the two shafts, and connected by an intermediate flexible member, or "hose," formed of rubber or the like, which is capable of stretching and becoming distorted to compensate for faulty alignment or relative endwise movement of the shafts. These prior devices have been unsatisfactory in use because the intermediate flexible member, being of substantial length, has been distorted angularly to an excessive degree by the torsional stresses transmitted therethrough with a resulting stretching of the fibers of the material and a shortening of the effective length of the member as a whole, thereby drawing the connected shafts toward each other and producing end thrusts on bearings and the like. These conditions have resulted in a rapid deterioration of the coupling and of the shaft bearings.

The principal object of the present invention is to overcome the above mentioned difficulties and others by providing an improved coupling comprising a pair of coupling members adapted to be attached to the ends of two shafts and having interposed between them an intermediate member of hard material which is flexibly connected to them by rings of soft material adapted to be distorted to compensate for lack of alignment of the shafts. A further object is to provide an improved coupling of this type in which an intermediate member of hard material and having substantial length is connected to the coupling members by relatively thin rings of resilient deformable material capable of compensating for lack of alignment of the shafts without producing distortion of the intermediate member and without causing substantial end thrust upon the connected shafts. Still another object of the invention is to provide a flexible coupling comprising a pair of unyielding coupling members adapted to be attached to a pair of substantially aligned shafts, in combination with an intermediate member of hard material connected to the coupling members by rings of rubber or the like which are vulcanized to or otherwise permanently attached to the intermediate member and the coupling members. Another object of the invention is to provide a coupling comprising two coupling members of hard material adapted to be mounted upon the ends of two substantially aligned shafts and having interposed between them an intermediate member of hard material and two connecting rings of relatively soft deformable material, one of the coupling members having means for permitting relative endwise movement thereof with respect to the shaft on which it is mounted. Other objects relate to various features of construction and arrangement which will appear more fully hereinafter.

The nature of the invention will be understood from the following specification taken with the accompanying drawings in which several embodiments of the invention are illustrated. In the drawings, Figure 1 shows a longitudinal axial section through one form of coupling embodying the present invention, the shafts upon which the coupling members are mounted being shown in elevation;

Fig. 5 shows a longitudinal axial section through another form of coupling embodying the present invention, wherein means are provided for permitting relative longitudinal movement of one of the coupling members upon one of the shafts;

Fig. 6 shows a longitudinal axial section through the coupling illustrated in Fig. 5 when the shafts and the connecting parts have been removed;

Fig. 7 shows an end elevation of the right-hand coupling member illustrated in Fig. 6 showing the longitudinal grooves through which a connection is made with the shaft; and Fig. 8 shows an end elevation of the right-hand shaft shown in Fig. 5 with the toothed driving member mounted thereon.

Figure 1:
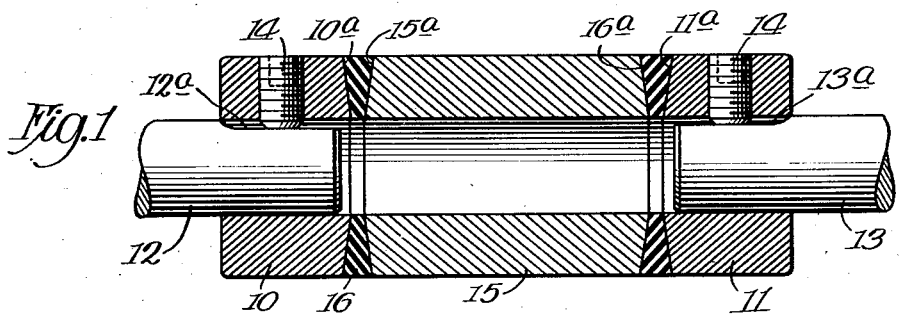
Figure 2:
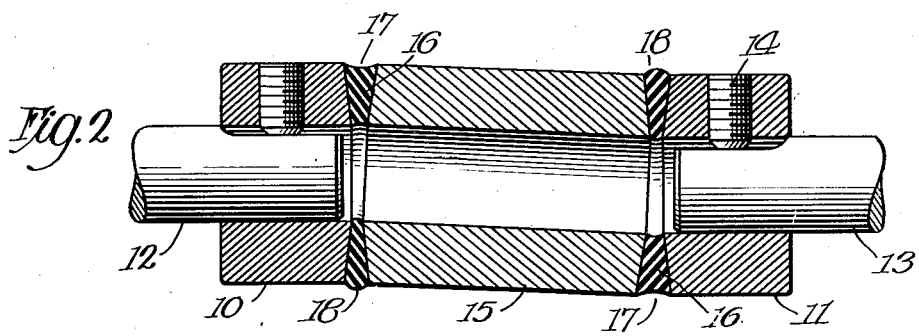
Fig. 2 is a sectional view similar to that of Fig. 1 showing the relative positions of the parts when there is a substantial lateral displacement of the connected shafts.

The form of the invention illustrated in Figs. 1 and 2 of the drawings comprises a pair of coupling members 10 and 11 formed of hard material, such as steel, brass, hard rubber, or the like, and having central cylindrical bores which are engaged by the shafts 12 and 13, respectively. The shafts are commonly flattened at their ends as shown at 12ª and 13ª to provide surfaces which may be engaged by the inner ends of the set screws 14 which are mounted in threaded apertures in the coupling members for securing them in fixed positions on the shafts. The coupling members 10 and 11 are connected by an intermediate power transmitting member 15 and two similar connecting members or rings 16, all of which are of circular cross section with central apertures therethrough. The member 15 is adapted to be formed of hard material, such as steel, brass, hard rubber or the like, which will be substantially incompressible and not subject to distortion under the influence of the forces which are transmitted from one coupling member to the other. The connecting members 16 are preferably formed of soft rubber or rubber which is reinforced by textile fabric or the like, or other similar deformable material which is resilient and relatively soft so that it is capable of being compressed and distorted to compensate for lack of alignment of the two shafts 12 and 13. These connecting rings 16 are preferably vulcanized on their end surfaces to the end surfaces of the coupling members 10 and 11 and the intermediate member 15, thus providing in effect, an integral construction for the entire coupling while securing the advantage of employing an intermediate member 15 which is not subject to distortion. The inner end surfaces 10ª and 11ª of the coupling members are preferably tapered outwardly away from the intermediate member 15 and the surfaces 15ª of the intermediate member are similarly tapered outwardly and away from the end surfaces 10ª and 11ª of the coupling members. The connecting members 16 contact on their end faces with these surfaces 10ª, 11ª, and 15ª so that the end faces 16ª of each connecting member diverges outwardly. These connecting rings thus have a gradually increasing thickness toward their outer margins so that there is a greater body of deformable material near the outer circumference of the coupling member where the greatest degree of distortion occurs when the shafts are out of alignment with each other.

In Fig. 2 of the drawings, there is illustrated, upon a somewhat exaggerated scale, the relative positions of the parts of the coupling shown in Fig. 1 when the shafts 12 and 13 are out of alignment, thereby causing a substantial distortion of the connecting rings 16 during the rotation of the shafts. It will be observed that one side of each ring is elongated and its opposite circumferential margins drawn in by the stretching of the material of which it is formed, as shown at 17, while at the opposite side of the ring, the material is compressed and bulges outwardly and inwardly, as shown at 18, due to the inclined position of the intermediate member 15 which remains without substantial distortion under these conditions. The tendency of the coupling to produce an end thrust upon the shafts is reduced to a minimum because of the limited thickness of the member 16 and, at the same time, these members have sufficient body to permit adjustment of their parts and of the intermediate member 15 through the lack of alignment of the shafts, without setting up substantial transverse pressures on the ends of the shafts. The forces are thus transmitted through the connecting members 16 primarily by tensile and compressive stresses in the bodies of these members and shearing stresses at the joints between these members and the next adjacent members, without substantial tendency, however, to stretch unduly or permanently elongate the material of which the connecting rings are formed. The coupling members 10 and 11 and the intermediate member 15 may be formed of any hard and substantially unyielding material which is capable of being united by vulcanization to the connecting member 16, and the intermediate member 15 may be formed of any material of which the coupling members are formed.

Figure 3:
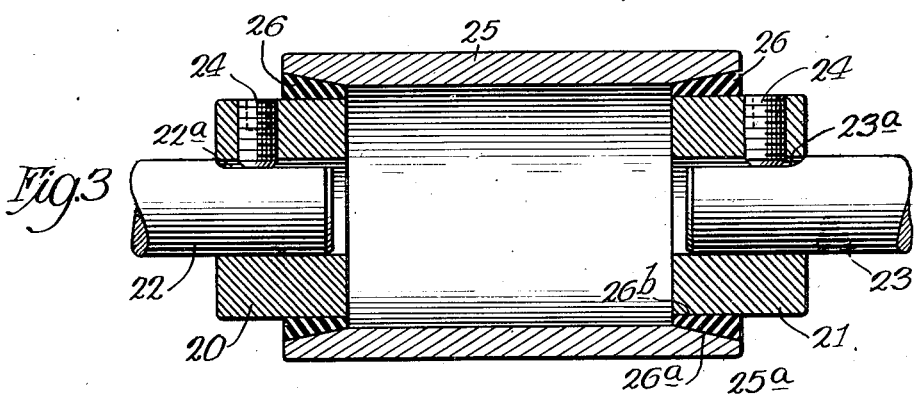
Fig. 3 shows a longitudinal axial section through a modified form of the invention in which the ends of the intermediate member surround portions of the coupling members.
Figure 4:
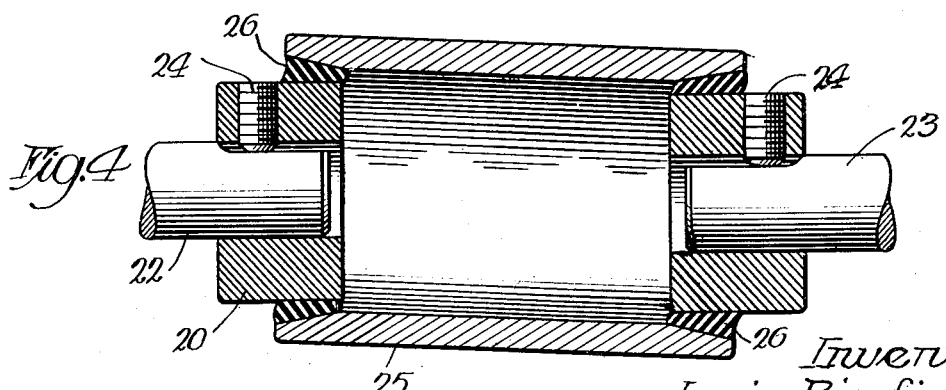
Fig. 4 is a sectional view showing the relative positions of the parts of the coupling illustrated in Fig. 3 when there is a substantial lack of alignment of the two connected shafts.

In the form of the invention shown in Figs. 3 and 4, the coupling comprises the same principal elements as the form of coupling heretofore described but is distinguished therefrom in that the intermediate power transmitting member surrounds the end portions of the coupling members to which it is connected by flexible rings of soft material, this form of construction being particularly adapted for couplings of larger sizes which are intended for use in transmitting an increased amount of power. In this embodiment, two coupling members 20 and 21 in the form of hollow, cylindrical members, are adapted to be secured upon a pair of substantially aligned shafts 22 and 23, respectively, by means of set screws 24 which engage threaded apertures in the coupling members and bear at their inner ends upon the flat surfaces 22ª and 23ª of the shafts. The two coupling members 20 and 21 are connected by an intermediate power transmitting member 25, in the form of a cylindrical tube or shell, and two connecting members 26 in the form of rings which are united to the coupling members and to the end portions of the intermediate member. As in the form of construction heretofore described, the coupling members 20 and 21 and the intermediate power transmitting member 25 are preferably formed of hard material, such as steel, brass, hard rubber, or the like, which is capable of being united by vulcanization with the connecting rings 26, these rings being formed preferably of comparatively soft rubber or rubber reinforced by textile fabric, or the like, so that the rings are capable of being distorted to permit compensation for lack of alignment of the connected shafts. The intermediate member 25 is provided at its ends with outwardly diverging annular surfaces 25ª adapted to contact with the similar outwardly diverging annular surfaces 26ª formed on the connecting members. These connecting members are provided with cylindrical bores 26ᵇ which are closely fitted by the coupling members 20 and 21 to which they are united by vulcanization or the like. By this arrangement, the connecting members 26 have greater thickness at their outer ends where the greatest distortion of the members take place when the shafts are out of alignment, as illustrated on a somewhat exaggerated scale in Fig. 4. As here shown, the material of the rings 26 is adapted to stretch and elongate to some extent at certain points due to the misalignment of the shafts, while at diametrically opposite points the material is compressed.

In the form of the invention shown in Figs. 5 to 8, inclusive, the principles of construction heretofore described are employed but there is provided, in addition, means for connecting one of the coupling members with its shaft in such a manner that relative endwise movement is permitted without causing an end thrust to be exerted upon the shafts by the transmission of forces through the coupling. In this embodiment, the two coupling members 30 and 31, of circular cross section, are mounted upon two substantially aligned shafts 32 and 33. These coupling members 30 and 31 are connected by an intermediate power transmitting member 35 and two annular connecting members 36. As in the constructions previously described, the coupling members 30 and 31 and the intermediate member 35 are adapted to be formed of steel, brass, hard rubber, or other hard material, capable of being united by vulcanization with the connecting members 36 which are preferably formed of rubber or rubber reinforced by textile fabric, or the like, so that they are capable of being distorted and compressed to compensate for lack of alignment of the shafts. As in the form of the invention shown in Fig. 1, the end surfaces 30$^a$ and 31$^a$ of the coupling members are formed to taper outwardly away from the intermediate member 35 and this intermediate member has its end surfaces 35$^a$ inclined outwardly away from the coupling members so that the connecting rings 36 increase gradually in thickness from their inner margins outwardly.

The coupling member 30 is secured to the shaft 32 by a set screw 34 passing through a threaded aperture in the coupling member and engaging the flat surface 32$^a$ which is formed on one side of the shaft. The other coupling member 31 is connected to the shaft 33 through an intermediate driving member 37 which is pressed onto the shaft 33 or otherwise secured in fixed position thereon and which occupies the chamber 31$^b$ formed in the coupling member 31 by enlarging the outer portion of the tubular bore extending therethrough. The wall of this chamber 31$^b$ is provided with a plurality of longitudinally extending grooves 31$^c$ which are engaged by the longitudinally extending teeth or lugs 37$^c$ formed on the driving member 37 which is formed of hard material. These teeth or lugs 37$^c$ have a sliding engagement with the grooves 31$^c$ so that when the coupling is in operation and forces are being transmitted from one shaft to the other, the coupling member 31 is capable of sliding longitudinally on the member 37 to relieve the shafts 32 and 33 of end thrusts which may be set up by the compression or distortion of the rings 36 or, for example, by the end float of a motor armature mounted on one of the shafts.

In any form of the invention, the only parts which yield in the plane of rotation under torsional stress during the transmission of forces through the coupling are the comparatively thin connecting members which are capable of being distorted in either angular direction and of being compressed or elongated sufficiently to compensate for lack of alignment of the shafts while being subjected to shearing stresses on their surfaces of adhesion to the connected members. The angular distortion of the coupling as a whole is therefore comparatively limited.

In the manufacture of these couplings, a variety of materials, such as those heretofore mentioned, may be used, but it is now considered the preferred practice to form all of the major parts of rubber, either natural or synthetic, in two compounds one of which becomes substantially unyielding under the vulcanizing process while the other becomes soft and yielding. The first compound is used in preforming the coupling members and the intermediate member and the second compound is used in forming the comparatively thin connecting rings. These parts are then placed end to end in proper order in a mold and upon the application of suitable temperature and pressure are vulcanized to each other. The coupling is thus capable of being formed of materials of low cost and by a simple and inexpensive process of manufacture.

Although certain forms of the invention have been shown and described by way of illustration, it will be understood that it may be constructed in various other forms coming within the scope of the appended claims.

The subject matter of the inventions disclosed in Figs. 5 to 8, inclusive, is claimed in my continuation-in-part application Serial No. 218,278, filed July 9, 1938, entitled "Couplings".

I claim:

1. The combination in a coupling for connecting two substantially aligned shafts, of a pair of coupling members each adapted to be secured upon a separate one of said shafts, an intermediate power transmitting member, and rubber rings each vulcanized to said intermediate member and to one of said coupling members, said rubber rings increasing in thickness from their inner margins outwardly, said intermediate member and said coupling members having tapered end surfaces to correspond to the increase in thickness of said rings, said intermediate member being supported entirely by said rings.

2. The combination in a coupling for connecting two substantially aligned shafts, of a pair of coupling members each adapted to be secured upon a separate one of said shafts, an elongated intermediate power transmitting member, and relatively thin deformable resilient connecting members secured to the ends of said intermediate member and to the ends of said coupling members, said connecting members being in the form of annular rings increasing in thickness from their inner margins outwardly, said intermediate member being mounted in a free floating position supported entirely by said connecting members.

3. The combination in a coupling for connecting two substantially aligned shafts, of a pair of coupling members each adapted to be mounted upon and operatively connected with a separate one of said shafts, an elongated intermediate power transmitting member extending endwise between said coupling members and spaced from each of said coupling members, said coupling members and said intermediate member having oppositely disposed annular end surfaces, and rubber rings each vulcanized to two of said oppositely disposed end surfaces, said intermediate member being supported entirely by said rubber rings.

LOUIS RICEFIELD.